(12) United States Patent
Cheng et al.

(10) Patent No.: US 11,314,063 B2
(45) Date of Patent: Apr. 26, 2022

(54) ZOOM LENS

(71) Applicant: Young Optics Inc., Hsinchu (TW)

(72) Inventors: Hung-You Cheng, Hsinchu (TW);
Kuo-Chuan Wang, Hsinchu (TW);
Yu-Hung Chou, Hsinchu (TW)

(73) Assignee: YOUNG OPTICS INC., Hsinchu Science Park (TW)

( * ) Notice: Subject to any disclaimer, the term of this patent is extended or adjusted under 35 U.S.C. 154(b) by 0 days.

(21) Appl. No.: 16/939,527

(22) Filed: Jul. 27, 2020

(65) Prior Publication Data

US 2020/0355895 A1    Nov. 12, 2020

Related U.S. Application Data

(63) Continuation of application No. 15/910,918, filed on Mar. 2, 2018, now abandoned.

(30) Foreign Application Priority Data

Mar. 3, 2017 (TW) ................................. 106107117
Mar. 15, 2017 (TW) ................................. 106108611

(51) Int. Cl.
*G02B 15/14* (2006.01)
*G02B 13/18* (2006.01)
*G02B 9/10* (2006.01)

(52) U.S. Cl.
CPC ........... *G02B 15/1425* (2019.08); *G02B 9/10* (2013.01); *G02B 13/18* (2013.01)

(58) Field of Classification Search
CPC ............................. G02B 13/04; G02B 9/04–10
See application file for complete search history.

(56) References Cited

U.S. PATENT DOCUMENTS

| 7,400,455 | B2 | 7/2008 | Sawamota | |
|---|---|---|---|---|
| 8,040,613 | B2 | 10/2011 | Arai et al. | |
| 2002/0034021 | A1* | 3/2002 | Murata | G02B 13/04 |
| | | | | 359/749 |
| 2010/0277811 | A1 | 11/2010 | Kim | |

(Continued)

FOREIGN PATENT DOCUMENTS

| TW | 201321793 A | 6/2013 |
|---|---|---|
| TW | 201321793 A | 6/2013 |

(Continued)

OTHER PUBLICATIONS

Southall, James, "The principles and methods of geometric optics," 1910, Macmillan, pp. 533-537, 5 pages.

(Continued)

*Primary Examiner* — Robert E. Tallman
(74) *Attorney, Agent, or Firm* — Muncy, Geissler, Olds & Lowe, P.C.

(57) ABSTRACT

A zoom lens includes a first lens group with a negative refractive power, a second lens group with a positive refractive power, and an aperture stop disposed in and movable with the second lens group. Each of the first lens group and the second lens group moves individually. The zoom lens further includes a doublet lens disposed on a first side of the aperture stop and between the first lens group and the aperture stop, and at most two lenses including at least one aspheric lens are disposed on a second side of the aperture stop.

20 Claims, 13 Drawing Sheets

(56) References Cited

U.S. PATENT DOCUMENTS

| | | |
|---|---|---|
| 2014/0063612 A1 | 3/2014 | Kubota |
| 2014/0327888 A1 | 11/2014 | Kawana |
| 2016/0154223 A1 | 6/2016 | Oshishi |

FOREIGN PATENT DOCUMENTS

| | | |
|---|---|---|
| TW | 201626042 A | 7/2016 |
| TW | 201626042 A | 7/2016 |

OTHER PUBLICATIONS

Bently, Julie, "Field Guide to Lens Design," 2012, SPIE, p. 111, 1 page.

Office Action issued in corresponding TW application No. 106108611 dated Apr. 28, 2020.

\* cited by examiner

ZOOM LENS

CROSS-REFERENCE TO RELATED APPLICATIONS

This application is a continuation application of application Ser. No. 15/910,918 filed Mar. 2, 2018, and this application claims priority of Application Nos. 106107117 filed in Taiwan on Mar. 3, 2017, and 106108611 filed in Taiwan on Mar. 15, 2017, the contents of which are incorporated by reference herein.

BACKGROUND OF THE INVENTION a. Field of the Invention

The invention relates generally to an optical lens, and more particularly to a zoom lens.

b. Description of the Related Art

With the advances in optical-electronic technologies, image-sensing devices such as a projector, a digital video camera and a digital camera have been widely used in daily life. A zoom lens that functions as a key component for an image-sensing device can, through zooming and focusing adjustments, precisely focus an object image on a screen or CCD, and thus the performance of the zoom lens is closely related to the image quality. Nowadays, there is a growing need for fabricating a high-performance, compact, light and low-cost zoom lens to maintain competitive advantage. Accordingly, it is desirable to provide a zoom lens that has a reduced size, a large aperture stop, low aberrations, inexpensive prices, high performance and high resolution.

BRIEF SUMMARY OF THE INVENTION

According to one aspect of the present disclosure, a zoom lens includes a first lens group with a negative refractive power, a second lens group with a positive refractive power, and an aperture stop disposed in and movable with the second lens group. Each of the first lens group and the second lens group moves individually. The zoom lens further includes a doublet lens disposed on a first side of the aperture stop and between the first lens group and the aperture stop, and at most two lenses including at least one aspheric lens are disposed on a second side of the aperture stop.

According to the above embodiment, the zoom lens may have at least one doublet lens to balance chromatic aberration, and may have at least one aspheric lens to reduce aberration. Besides, the zoom lens may have a reduced number of total lenses and a large aperture stop. Further, the zoom lens may have a smaller value of EXP to reduce the total track length and thus is favorable for miniaturization, where Exp denotes a distance from an intersection to an image plane of a light valve, and the intersection is formed by an optical axis of the zoom lens crossed by a chief ray emerging from a designated point of a periphery of the light valve. Accordingly, the zoom lens is featured with good correction ability, reduced size, and improved image qualities.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

Figure 1:
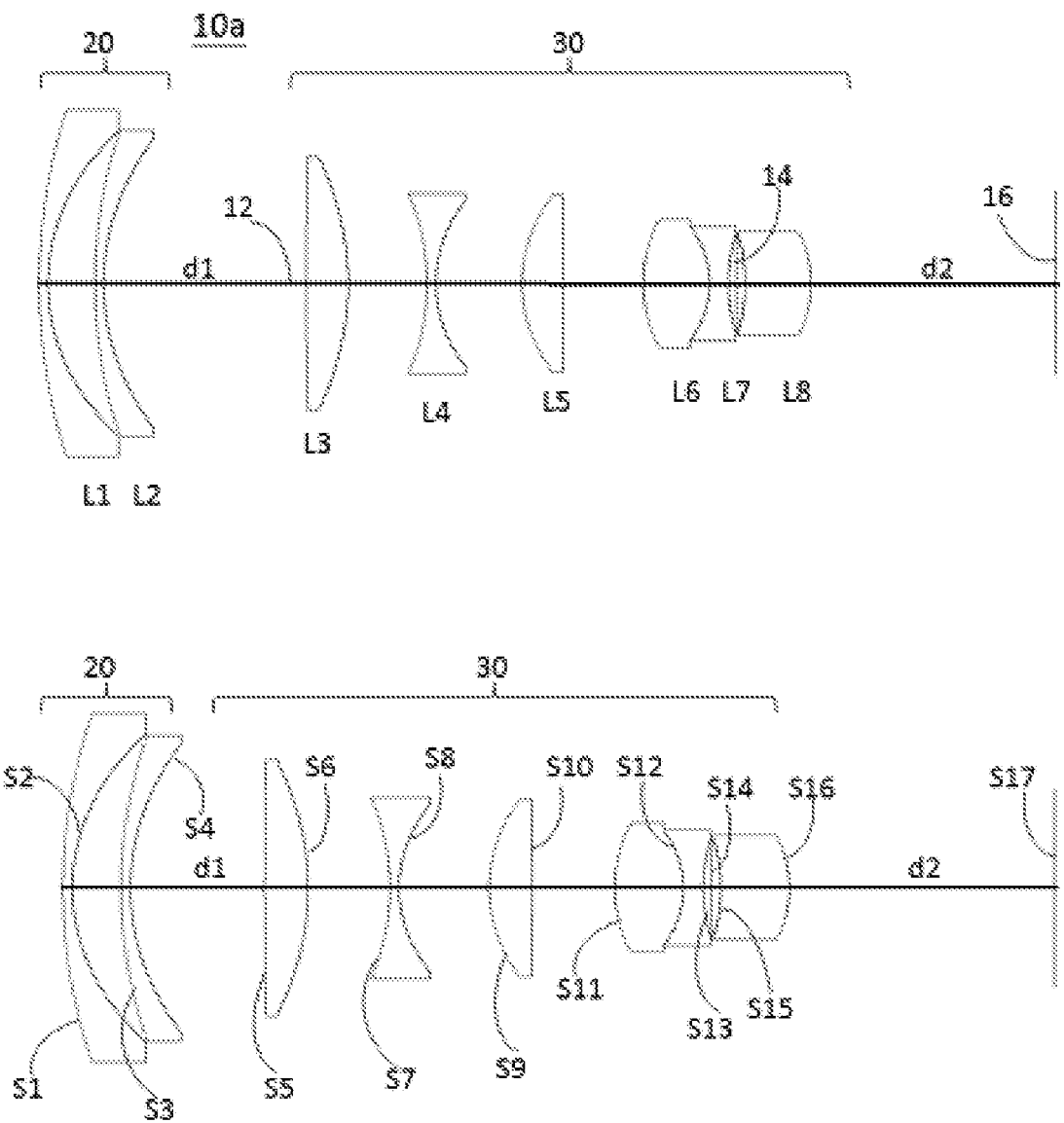
FIG. 1 shows a schematic diagram illustrating a zoom lens respectively in a wide-angle position and in a telephoto position according to an embodiment of the invention.

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.). Besides, though the following embodiments only describe the application environment using projection devices and display systems, the invention, however, is not limited thereto. The following embodiments of a zoom lens may be applied to any system or environment according to actual demands.

According to an embodiment of the invention, a zoom lens includes a first lens group with a negative refractive power, a second lens group with a positive refractive power, and an aperture stop disposed in and movable with the second lens group. Each of the first lens group and the second lens group moves individually. The zoom lens further includes a doublet lens disposed on a first side of the aperture stop and between the first lens group and the aperture stop, and at most two lenses including at least one aspheric lens are disposed on a second side of the aperture stop. The zoom lens may satisfy one of the following conditions: (1) the first lens group comprises two meniscus lenses with a negative refractive power, the second lens group comprises two lenses with a positive refractive power located between the two meniscus lenses and the first doublet lens, and the aspheric lens has a positive refractive power; (2) the first lens group comprises a meniscus lens with a negative refractive power and an aspheric lens, the second lens group comprises a meniscus lens with a negative refractive power located between the first lens group and the first doublet lens, and each aspheric lens in the first lens group and the second lens group has a positive refractive power; (3) the first lens group comprises two meniscus lenses with a negative refractive power, the second lens group comprises a biconvex lens with a positive refractive power and a second doublet lens, the biconvex lens and the second doublet lens are located between the first lens group and the first doublet lens, and the aspheric lens of the second lens group has a positive refractive power.

According to another embodiment of the invention, a zoom lens includes a first lens group and a second lens group arranged in order along a direction, an aperture stop disposed in the second lens group, and a doublet lens disposed on a first side of the aperture stop and between the first lens group and the aperture stop, and at least one aspheric lens disposed on a second side of the aperture stop. Each of the first lens group and the second lens group moves individually. The zoom lens further satisfies the condition: −26 mm≥EXP≥28.5 mm, where Exp denotes an exit pupil position that is measured as a distance from an intersection to an image plane of a light valve, and the intersection is formed by an optical axis of the zoom lens crossed by a chief ray emerging from a designated point of a periphery of the light valve. In an optical projection system, the image plane of a light valve is typically located in an object side of an optical lens but not an image side for projection of the optical lens. In case the zoom lens is designed to meet the condition of EXP<−28.5 mm, it may result in an excess long total track length and thus is difficult to miniaturize the entire lens assembly. In comparison, in case the zoom lens is designed to meet the condition of EXP>−26 mm, it may result in an excess short back focus to cause interference between illumination light and image light and thus worsen image qualities. In one embodiment, the doublet lens may include a lens with a positive refractive power and an index of refraction of smaller than 1.68.

In one embodiment, an F number of the zoon lens is no more than 2.2. In one embodiment, a zoom ratio of the zoom lens is in the range of 1.05-1.2. In one embodiment, a back focus distance of the zoom lens is in the range of 18-24 mm. In one embodiment, a throw ratio of the zoom lens in a wide-angle position is in the range of 1.3-1.6, where the throw ratio is the ratio of a throw distance to a screen width. In one embodiment, a total number of lenses of the zoom lens is no more than ten. In one embodiment, the aspheric lens is made from glass or plastic.

The light valve LV, which is a commonly used device, is a kind of spatial light modulator. The light valve LV is capable of converting illumination beams into image beams and may be a DMD, an LCD, an LCOS, etc.

According to the above embodiments, the zoom lens is featured with good correction ability, reduced size, and improved image qualities.

FIG. 1 shows a schematic diagram illustrating a zoom lens respectively in a wide-angle position and in a telephoto position according to an embodiment of the invention. As shown in FIG. 1, a zoom lens 10a includes a first lens group 20, a second lens group 30 and an aperture stop 14 disposed in and movable with the second lens group 30. The first lens group 20 and the second lens group 30 are capable of moving individually to switch between the wide-angle position (shown in the top of FIG. 1) and the telephoto position (shown in the bottom of FIG. 1). In detail, when the first lens group 20 and the second lens group 30 move towards each other, the zoom lens 10a is switched from the wide-angle position to the telephoto position to decrease an interval d1 and increase an interval d2. In comparison, when the first lens group 20 and the second lens group 30 move away from each other, the zoom lens 10a is switched from the telephoto position to the wide-angle position to increase the interval d1 and decrease the interval d2. Therefore, the zoom lens may include two lens groups, and the variable interval d1 distinguishes the first lens group 20 from the second lens group 30. In one embodiment, the first lens group 20 is movable in a direction of an optical axis 12 for focus adjustment, and the second lens group 30 is movable in the direction of the optical axis 12 for zooming.

The first lens group 20 has a negative refractive power, and the second lens group 30 has a positive refractive power. The first lens group 20 includes lenses L1 and L2 arranged in order, along the optical axis 12, from a magnified side (on the left of FIG. 1) to a minified side (on the right of FIG. 1). The second lens group 30 includes lenses L3, L4 L5, L6, L7 and L8 arranged in order, along the optical axis 12, from the magnified side to the minified side. The refractive powers of the lens L1, L2, L3, L4, L5, L6, L7 and L8 are negative, negative, positive, negative, positive, positive, negative and positive, respectively. In this embodiment, the lens L8 in the second lens group 30 nearest the minified side is an aspheric lens. The lens L6 and lens L7 are arranged together as one piece to form a doublet lens with a positive refractive power, and the aperture stop 14 is located between the lens L7 and the lens L8. In one embodiment, the lens L6 has a negative refractive power and the lens L7 has a positive refractive power. In one embodiment, the aspheric lens is made from glass.

Note that adjoining surfaces of each two adjacent lenses in a doublet lens have an identical radius of curvature, and that the lenses in a doublet lens can be fit together by various ways. For example, the lenses may be cemented together by applying an optical adhesive on two lens surfaces facing each other or stacked and then pressed to be fitted with each other.

In the zoom lens 10a, the lens L1 has a convex magnified-side surface S1 and a concave minified-side surface S2, the lens L2 has a convex magnified-side surface S3 and a concave minified-side surface S4, the lens L3 has a convex magnified-side surface S5 and a convex minified-side surface S6, the lens L4 has a concave magnified-side surface S7 and a concave minified-side surface S8, the lens L5 has a convex magnified-side surface S9 and a convex minified-side surface S10, the lens L6 has a convex magnified-side surface S11, the lens L7 has a concave magnified-side surface S12 and a concave minified-side surface S13, and the lens L8 has a concave magnified-side surface S15 and a convex minified-side surface S16 crossed with the optical axis 12. In this embodiment, the surface S17 denotes a surface of a cover glass of the light valve 16. In another embodiment, the surface S17 is an image plane of the light valve 16 (such as a DMD, an LCD or an LCOS).

The detailed optical data of the zoom lens 10a are shown in Table 1 and Table 2 below. Note the optical data provided below are not used for limiting the invention, and those skilled in the art may suitably modify parameters or settings of the following embodiment with reference of the invention without departing from the scope or spirit of the invention.

TABLE 1

| Surface number | Radius (mm) | Interval (mm) | Refractive index | Abbe number | Object description |
|---|---|---|---|---|---|
| S1 | 72.55 | 0.80 | 1.49 | 70.2 | lens L1 (meniscus) |
| S2 | 24.72 | 4.24 | | | |

TABLE 1-continued

| | | | | | |
|---|---|---|---|---|---|
| S3 | 61.79 | 0.80 | 1.49 | 70.2 | lens L2 (meniscus) |
| S4 | 29.67 | d1 | | | |
| S5 | 728.58 | 3.80 | 1.62 | 63.3 | lens L3 (biconvex) |
| S6 | −36.61 | 7.13 | | | |
| S7 | −29.43 | 0.80 | 1.49 | 70.2 | lens L4 (biconcave) |
| S8 | 16.50 | 7.82 | | | |
| S9 | 18.42 | 3.74 | 1.77 | 49.6 | lens L5 (biconvex) |
| S10 | −725.85 | 7.20 | | | |
| S11 | 18.10 | 6.00 | 1.62 | 63.3 | lens L6 (biconvex) |
| S12 | −11.91 | 1.70 | 1.70 | 30.1 | lens L7 (biconcave) |
| S13 | 22.25 | 0.74 | | | |
| S14 | ∞ | 0.75 | | | aperture stop |
| S15 | −30.13 | 6.00 | 1.77 | 50.0 | lens L8 (aspheric) |
| S16 | −15.18 | d2 | | | |
| S17 | ∞ | | | | cover glass surface |

| | d1 | d2 |
|---|---|---|
| wide | 18.31 | 20.00 |
| tele | 11.66 | 20.92 |

TABLE 2

| | F/# | EFL (mm) | TTL (mm) |
|---|---|---|---|
| wide | 2.09 | 15.68 | 92 |
| tele | 2.17 | 17.72 | 86.27 |

The Symbol F/# shown in the above table is an aperture value of the aperture stop.

In the embodiments of the invention, an effective focal length of the optical lens is denotes as "EFL", as shown in the above table.

In the embodiments of the invention, a total track length of the optical lens is denotes as "TTL", as shown in the above table. In this embodiment, the total track length TTL is a distance along the optical axis 12 measured from the surface S1 to the surface S17, as shown in the above table.

In the following design examples of the invention, each aspheric surface satisfies the following equation:

$$x = \frac{c'y^2}{1+\sqrt{1-(1+k)c'^2 y^2}} + Ay^4 + By^6 + Cy^8 + Dy^{10} + Ey^{12} + Fy^{14} + Gy^{16}\ldots,$$

where x denotes a sag of an aspheric surface along the optical axis 12, c' denotes a reciprocal of a radius of an osculating sphere, k denotes a Conic constant, y denotes a height of the aspheric surface measured in a direction perpendicular to the optical axis 12, and A-G are aspheric coefficients. Table 3 lists aspheric coefficients and conic constant of each aspheric surface of the zoom lens 10a.

TABLE 3

| | K | A | B | C | D |
|---|---|---|---|---|---|
| S15 | 3.17E+00 | −1.95E−04 | −1.02E−06 | −1.36E−09 | −4.87E−12 |
| S16 | 1.08E−01 | −4.71E−05 | −2.67E−07 | 5.07E−09 | −4.54E−11 |

Figure 2:
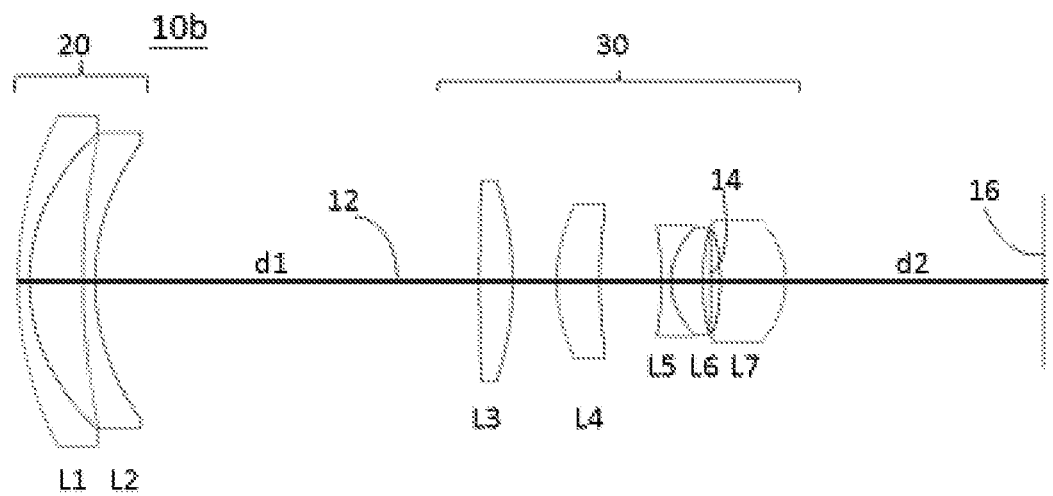
FIG. 2 shows a schematic diagram illustrating a zoom lens respectively in a wide-angle position and in a telephoto position according to another embodiment of the invention.
Figure 2:
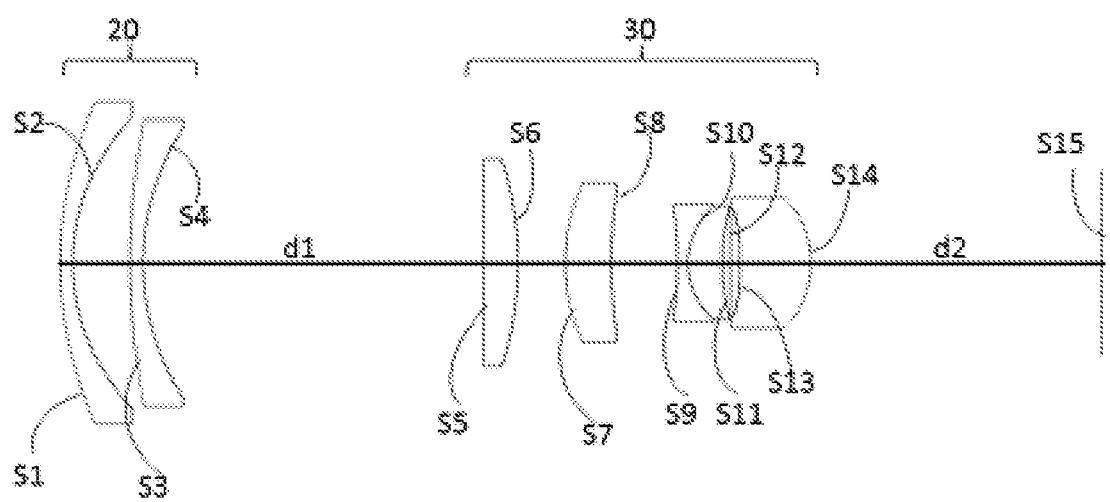

A zoom lens 10b according to another embodiment including lenses L1-L7 (with respective refractive power of negative, negative, positive, positive, negative, positive, positive) is described below with reference to FIG. 2. The lens L5 and lens L6 are arranged together as one piece to form a doublet lens with a negative refractive power. The aperture stop 14 is located between the lens L6 and the lens L7. The lens L7 is an aspheric lens and having a concave magnified-side surface S13 and a convex minified-side surface S14 crossed with the optical axis 12. In other embodiment, the lens L5 may have a positive refractive power and the lens L6 may have a negative refractive power. In this embodiment, the aspheric lens is made from glass. The detailed optical data of the zoom lens 10b are shown in Table 4 and Table 5, and the aspheric surface data are shown in Table 6 below.

TABLE 4

| Surface number | Radius (mm) | Interval (mm) | Refractive index | Abbe number | Object description |
|---|---|---|---|---|---|
| S1 | 43.73 | 1.00 | 1.58 | 59.4 | lens L1 (meniscus) |
| S2 | 22.87 | 4.71 | | | |
| S3 | 90.97 | 1.00 | 1.49 | 70.2 | lens L2 (meniscus) |
| S4 | 27.74 | d1 | | | |
| S5 | 427.37 | 2.88 | 1.62 | 63.3 | lens L3 (biconvex) |
| S6 | −38.02 | 3.86 | | | |
| S7 | 22.30 | 3.72 | 1.92 | 24.0 | lens L4 (meniscus) |
| S8 | 60.00 | 5.42 | | | |
| S9 | −38.35 | 0.80 | 1.81 | 22.8 | lens L5 (biconcave) |
| S10 | 8.36 | 2.80 | 1.88 | 40.8 | lens L6 (meniscus) |
| S11 | 25.19 | 0.63 | | | |
| S12 | ∞ | 0.85 | | | aperture stop |
| S13 | −36.73 | 5.74 | 1.73 | 40.4 | lens L7 (aspheric) |
| S14 | −11.19 | d2 | | | |
| S15 | ∞ | | | | cover glass surface |

| | d1 | d2 |
|---|---|---|
| wide | 33.66 | 20.45 |
| tele | 27.65 | 21.53 |

TABLE 5

| | F/# | EFL (mm) | TTL (mm) |
|---|---|---|---|
| wide | 2 | 15.7 | 89.67 |
| tele | 2.08 | 17.29 | 84.74 |

In this embodiment, the total track length TTL is a distance along the optical axis 12 measured from the surface S1 to the surface S15.

TABLE 6

| | K | A | B | C | D | E |
|---|---|---|---|---|---|---|
| S13 | 0 | −2.75E−04 | −6.40E−07 | −2.11E−07 | 6.60E−09 | −1.23E−10 |
| S14 | 0 | −5.69E−05 | −4.20E−07 | −2.40E−08 | 3.84E−10 | −5.71E−12 |

Figure 3:
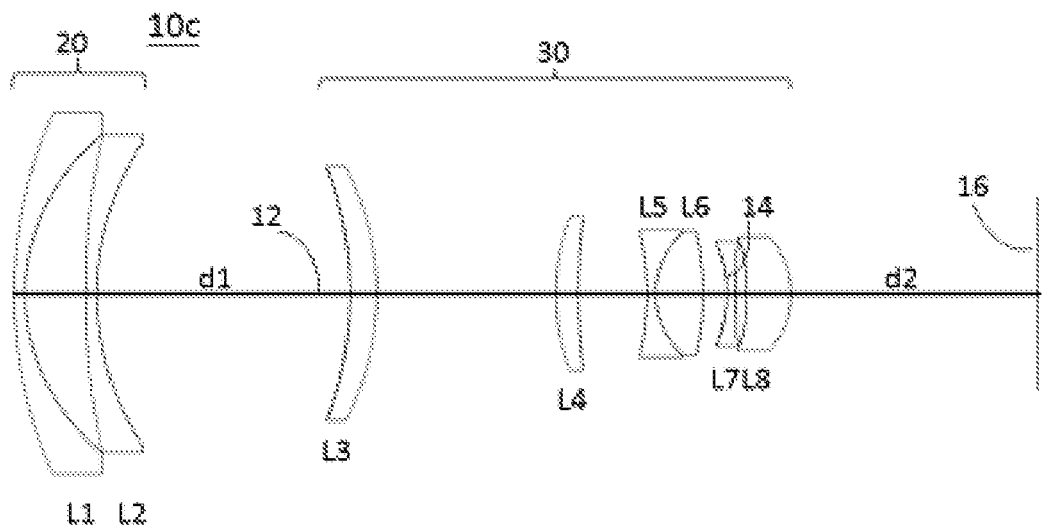
FIG. 3 shows a schematic diagram illustrating a zoom lens respectively in a wide-angle position and in a telephoto position according to another embodiment of the invention.
Figure 3:
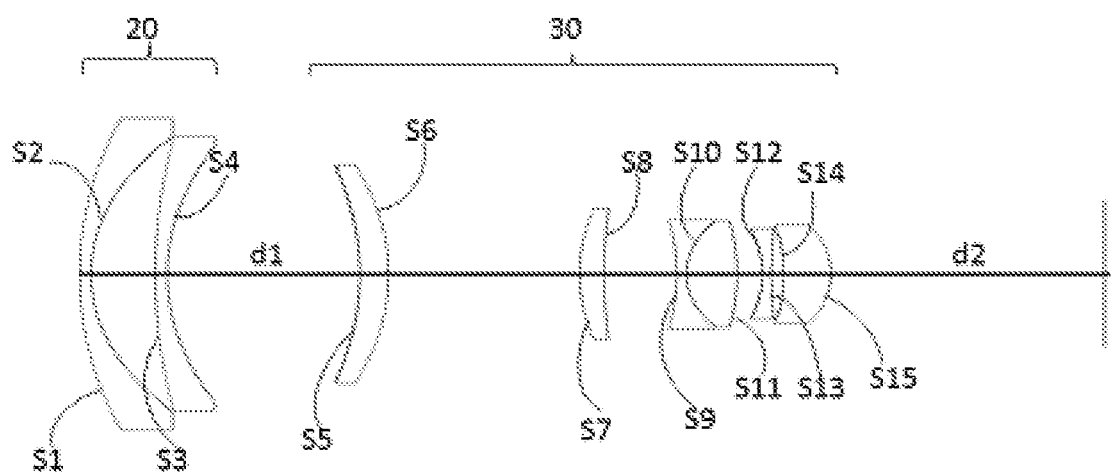

A zoom lens 10c according to another embodiment including lenses L1-L8 (with respective refractive power of negative, negative, positive, positive, negative, positive, negative, positive) is described below with reference to FIG. 3. The lens L5 and lens L6 are arranged together as one piece to form a doublet lens with a positive refractive power. The aperture stop 14 is located on the surface S12 of the lens L7 facing the magnified side. The lens L8 is an aspheric lens and having a concave magnified-side surface S14 and a convex minified-side surface S15 crossed with the optical axis 12. In other embodiment, the lens L5 may have a positive refractive power and the lens L6 may have a negative refractive power. In this embodiment, the aspheric lens is made from glass. The detailed optical data of the zoom lens 10c are shown in Table 7 and Table 8, and the aspheric surface data are shown in Table 9 below.

TABLE 7

| Surface number | Radius (mm) | Interval (mm) | Refractive index | Abbe number | Object description |
|---|---|---|---|---|---|
| S1 | 52.76 | 1.00 | 1.49 | 70.2 | lens L1 (meniscus) |
| S2 | 23.68 | 5.47 | | | |
| S3 | 90.65 | 1.00 | 1.49 | 70.2 | lens L2 (meniscus) |
| S4 | 32.29 | d1 | | | |
| S5 | −42.92 | 2.41 | 1.80 | 46.6 | lens L3 (meniscus) |
| S6 | −33.17 | 16.28 | | | |
| S7 | 26.68 | 2.05 | 1.95 | 32.3 | lens L4 (meniscus) |
| S8 | 76.10 | 6.22 | | | |
| S9 | −32.36 | 0.80 | 1.70 | 30.1 | lens L5 (biconcave) |
| S10 | 9.76 | 4.32 | 1.88 | 40.8 | lens L6 (biconvex) |
| S11 | −32.26 | 2.15 | | | |
| S12 | −15.72 | 0.80 | 1.72 | 29.5 | lens L7 (biconcave) aperture stop |
| S13 | 96.91 | 0.99 | | | |
| S14 | −47.67 | 4.03 | 1.69 | 52.7 | lens L8 (aspheric) |
| S15 | −11.15 | d2 | | | |
| S16 | ∞ | | | | cover glass surface |

| | d1 | d2 |
|---|---|---|
| wide | 23.03 | 20.30 |
| tele | 16.37 | 21.18 |

TABLE 8

| | F/# | EFL (mm) | TTL (mm) |
|---|---|---|---|
| wide | 2.07 | 15.64 | 93 |
| tele | 2.14 | 17.15 | 87.23 |

In this embodiment, the total track length TTL is a distance along the optical axis 12 measured from the surface S1 to the surface S16.

TABLE 9

| | K | A | B | C | D | E |
|---|---|---|---|---|---|---|
| S14 | 1.37E+01 | −2.73E−04 | −2.12E−06 | −1.94E−07 | 1.39E−08 | −7.53E−10 |
| S15 | 5.21E−02 | −7.22E−05 | −1.61E−06 | −1.26E−08 | 5.71E−10 | −5.32E−11 |

| | F | G |
|---|---|---|
| S14 | 1.93E−11 | −2.16E−13 |
| S15 | 1.28E−12 | −1.35E−14 |

Figure 4:
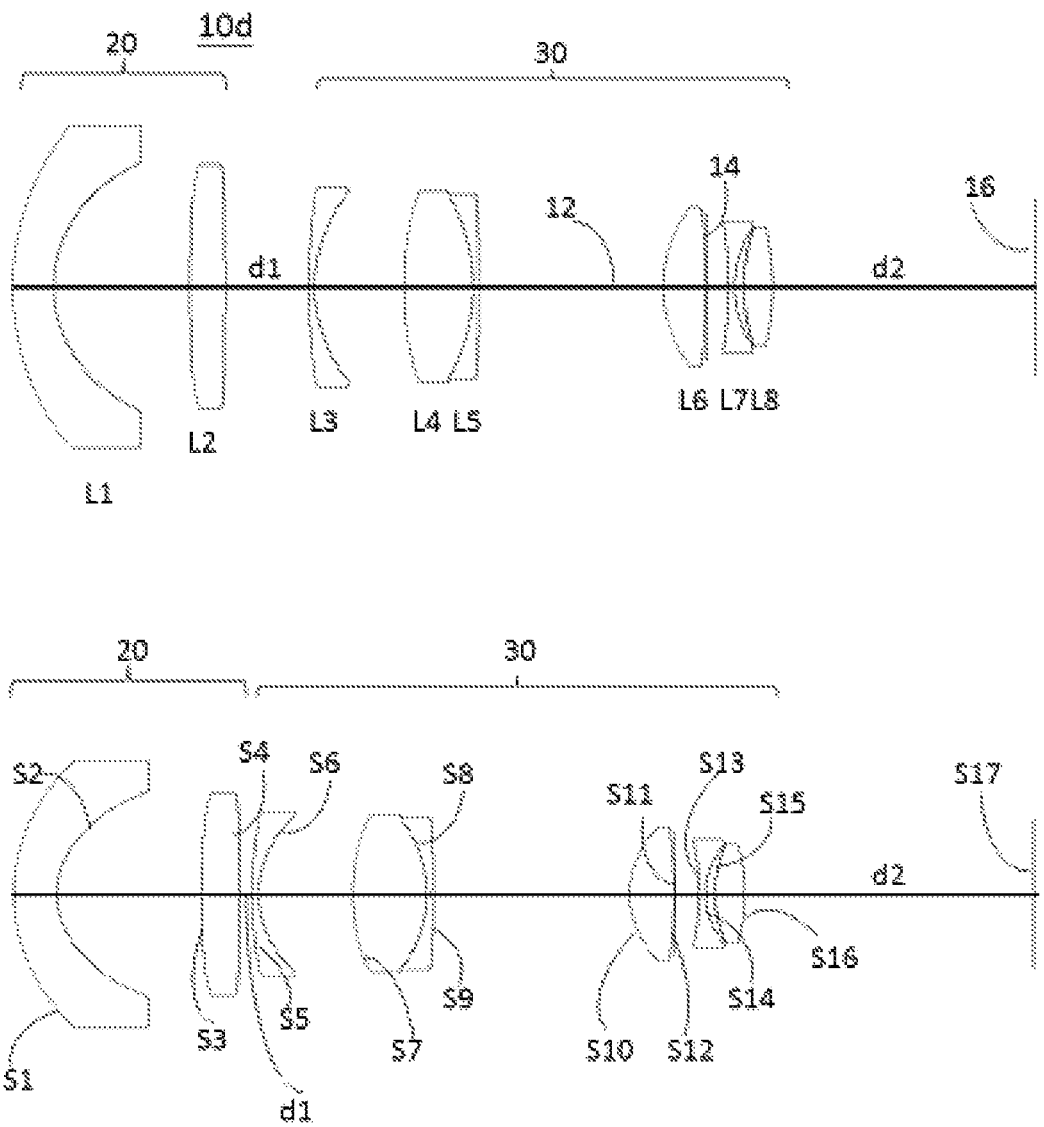
FIG. 4 shows a schematic diagram illustrating a zoom lens respectively in a wide-angle position and in a telephoto position according to another embodiment of the invention.

A zoom lens 10d according to another embodiment including lenses L1-L8 (with respective refractive power of negative, positive, negative, positive, negative, positive, negative, positive) is described below with reference to FIG. 4. The lens L4 and lens L5 are arranged together as one piece to form a doublet lens with a positive refractive power. The aperture stop 14 is located between the lens L6 and the lend L7. The lens L2 and the lens L8 are aspheric lenses, the lens L2 has a convex magnified-side surface S3 and a convex minified-side surface S4 crossed with the optical axis 12, and the lens L8 has a convex magnified-side surface S15 and a convex minified-side surface S16 crossed with the optical axis 12. In other embodiment, the lens L4 may have a negative refractive power and the lens L5 may have a positive refractive power. In this embodiment, the aspheric lens is made from glass. The detailed optical data of the zoom lens 10d are shown in Table 10 and Table 11, and the aspheric surface data are shown in Table 12 below.

TABLE 10

| Surface number | Radius (mm) | Interval (mm) | Refractive index | Abbe number | Object description |
|---|---|---|---|---|---|
| S1 | 28.56 | 3.50 | 1.70 | 55.5 | lens L1 (meniscus) |
| S2 | 13.86 | 11.76 | | | |
| S3 | 622.36 | 3.05 | 1.53 | 56.0 | lens L2 (aspheric) |
| S4 | −457.17 | d1 | | | |
| S5 | 74.78 | 0.50 | 1.49 | 70.2 | lens L3 (meniscus) |
| S6 | 16.56 | 7.67 | | | |
| S7 | 34.56 | 6.00 | 1.80 | 35.0 | lens L4 (biconvex) |
| S8 | −20.34 | 0.50 | 1.81 | 25.4 | lens L5 (meniscus) |
| S9 | −171.56 | 15.87 | | | |
| S10 | 14.96 | 3.60 | 1.77 | 49.6 | lens L6 (biconvex) |
| S11 | −89.05 | 0.10 | | | |
| S12 | ∞ | 1.92 | | | aperture stop |
| S13 | −44.22 | 0.50 | 1.70 | 30.1 | lens L7 (biconcave) |
| S14 | 11.97 | 0.79 | | | |
| S15 | 20.33 | 2.47 | 1.50 | 81.1 | lens L8 (aspheric) |
| S16 | −26.89 | d2 | | | |
| S17 | ∞ | | | | cover glass surface |

| | d1 | d2 |
|---|---|---|
| wide | 7.18 | 20.45 |
| tele | 1.00 | 21.22 |

TABLE 11

| | F/# | EFL (mm) | TTL (mm) |
|---|---|---|---|
| wide | 2.03 | 15.75 | 88 |
| tele | 2.09 | 17.34 | 82.59 |

In this embodiment, the total track length TTL is a distance along the optical axis 12 measured from the surface S1 to the surface S17.

TABLE 12

| | K | A | B | C | D |
|---|---|---|---|---|---|
| S3 | 0 | 2.00E−05 | 8.91E−08 | −4.92E−10 | 2.36E−12 |
| S4 | 0 | 7.44E−07 | 0 | −2.87E−10 | 0 |
| S15 | 0 | −1.70E−06 | 0 | 0 | 0 |
| S16 | 0 | 5.86E−05 | −3.46E−08 | 2.21E−09 | 1.93E−12 |

Figure 5:
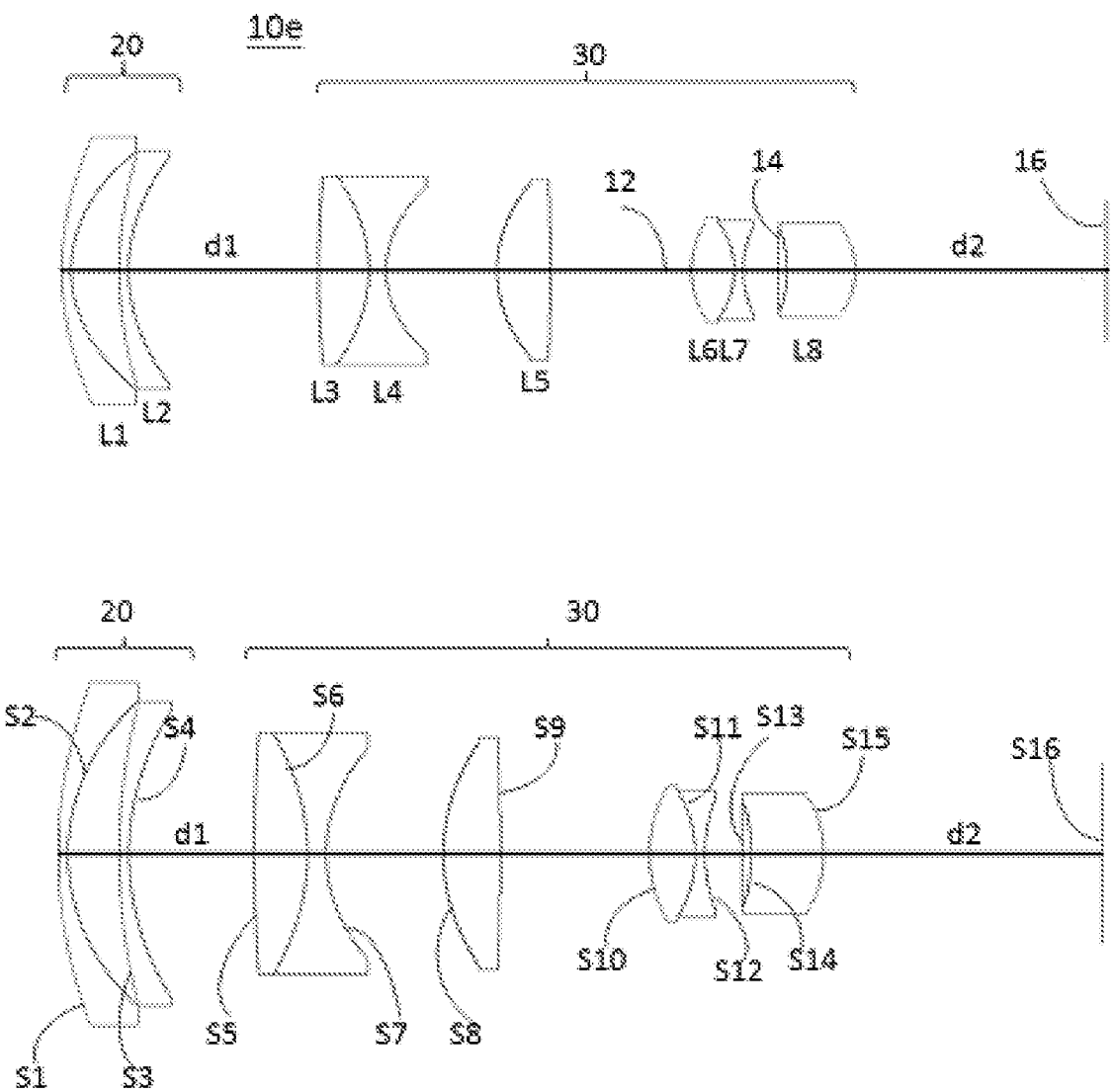
FIG. 5 shows a schematic diagram illustrating a zoom lens respectively in a wide-angle position and in a telephoto position according to another embodiment of the invention.
Figure 6:
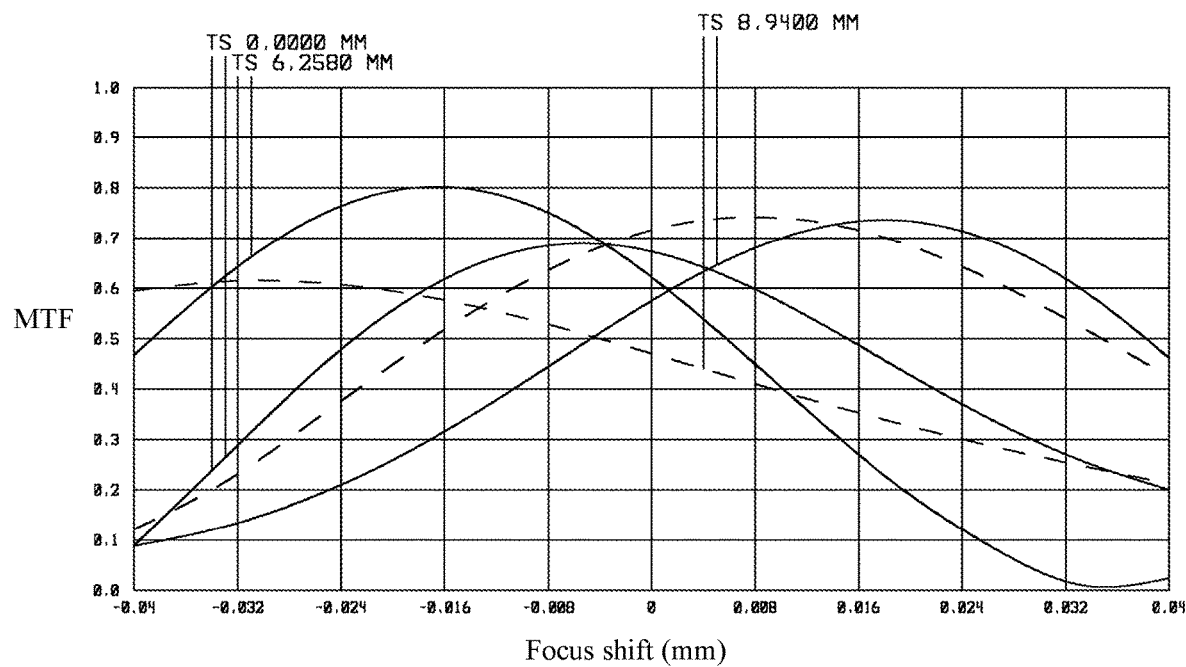
FIGS. 6-10 respectively show modulation transfer function curves of zoom lenses of FIGS. 1-5 in the wide-angle position.
Figure 7:
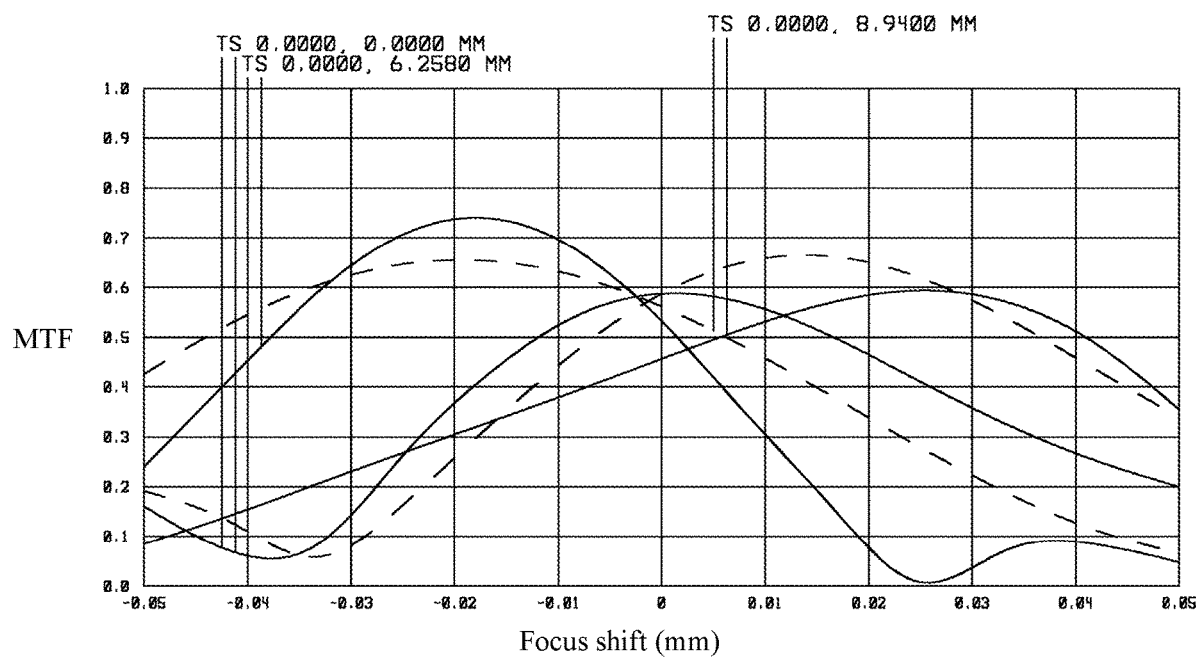
Figure 8:
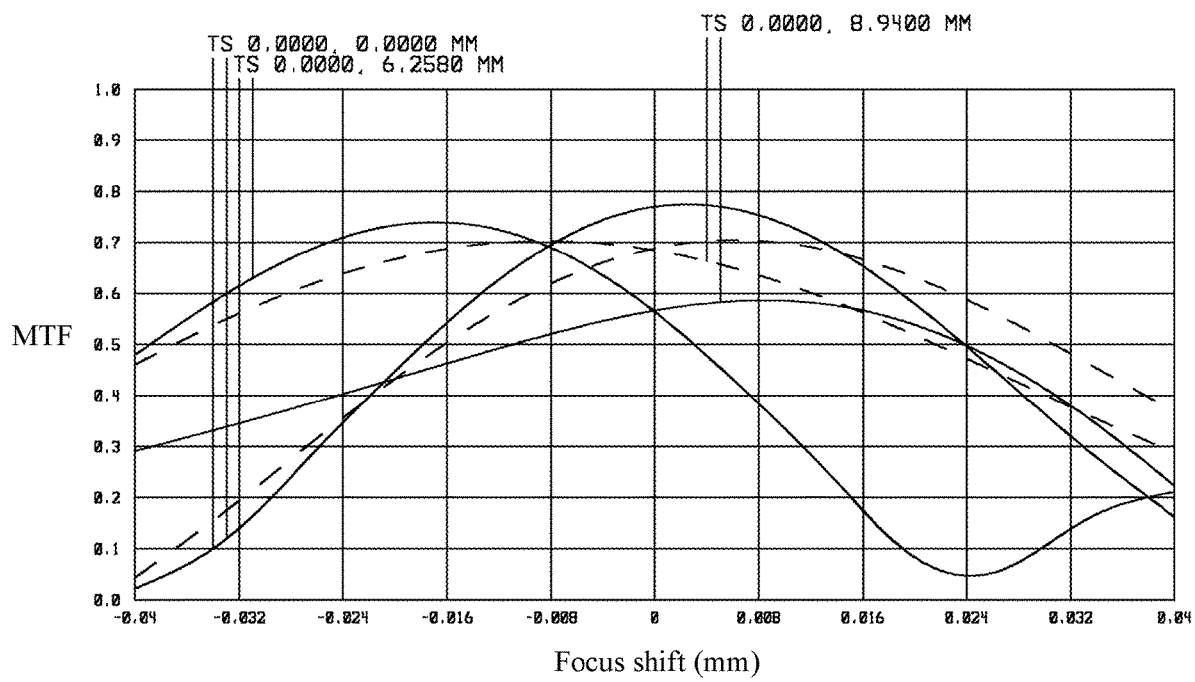
Figure 9:
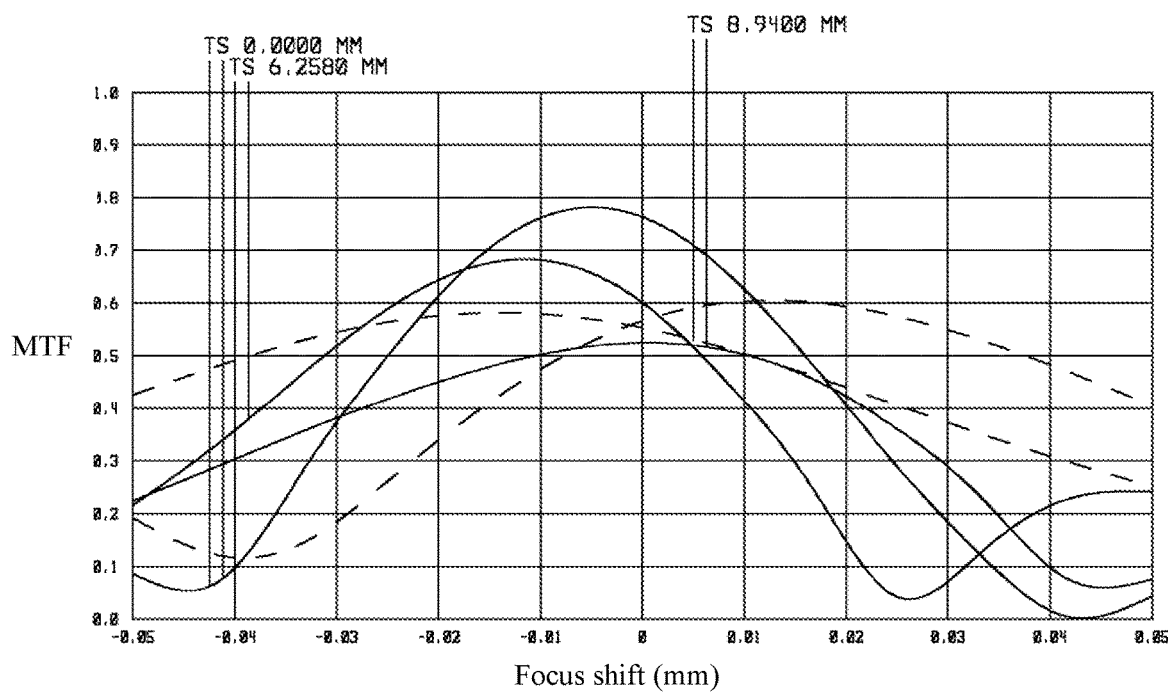
Figure 10:
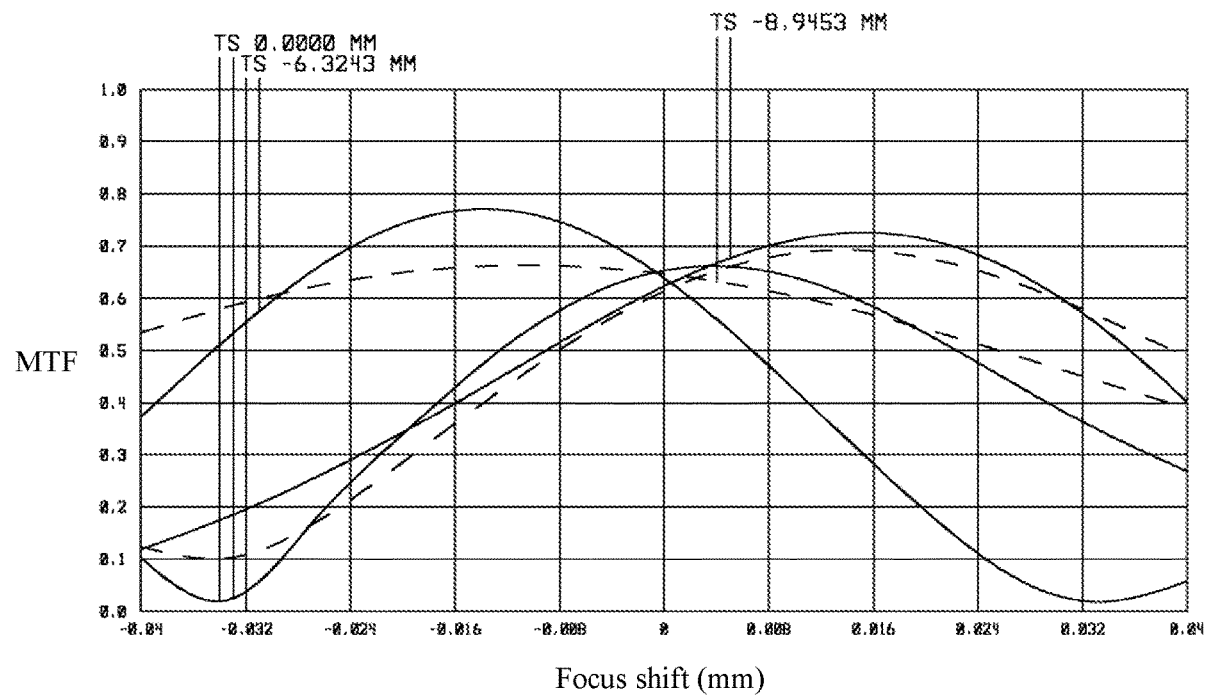
Figure 11:
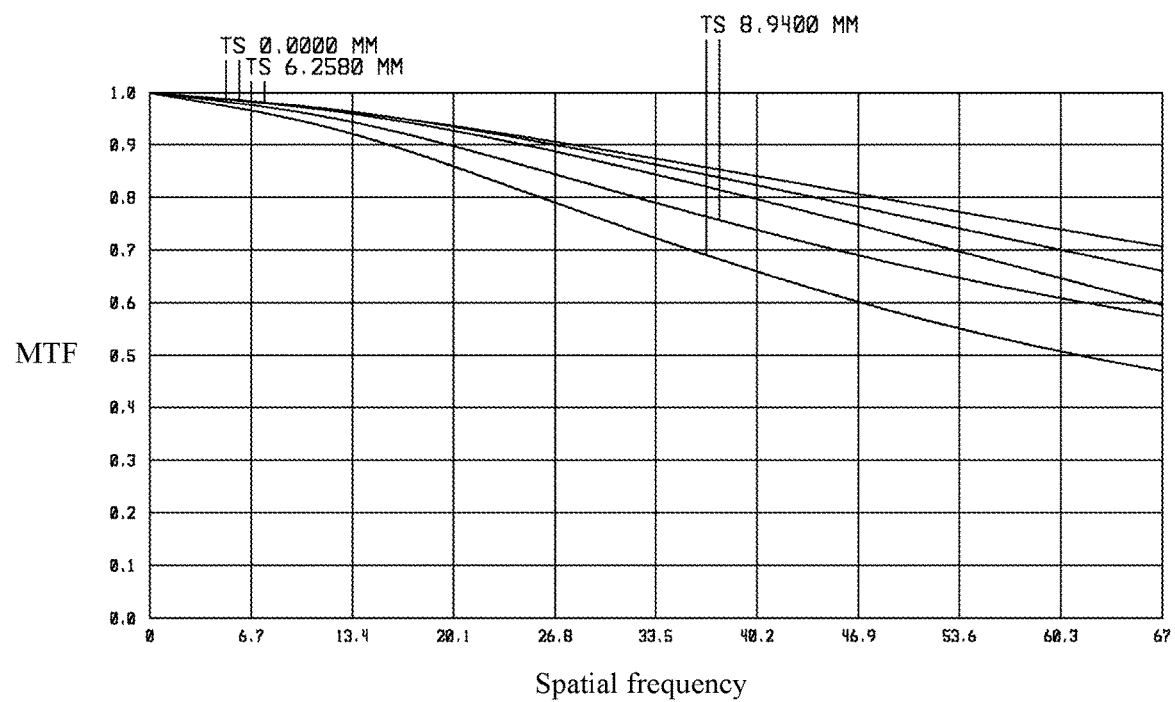
FIGS. 11-15 respectively show MTF curves of zoom lenses of FIGS. 1-5 in the wide-angle position.
Figure 12:
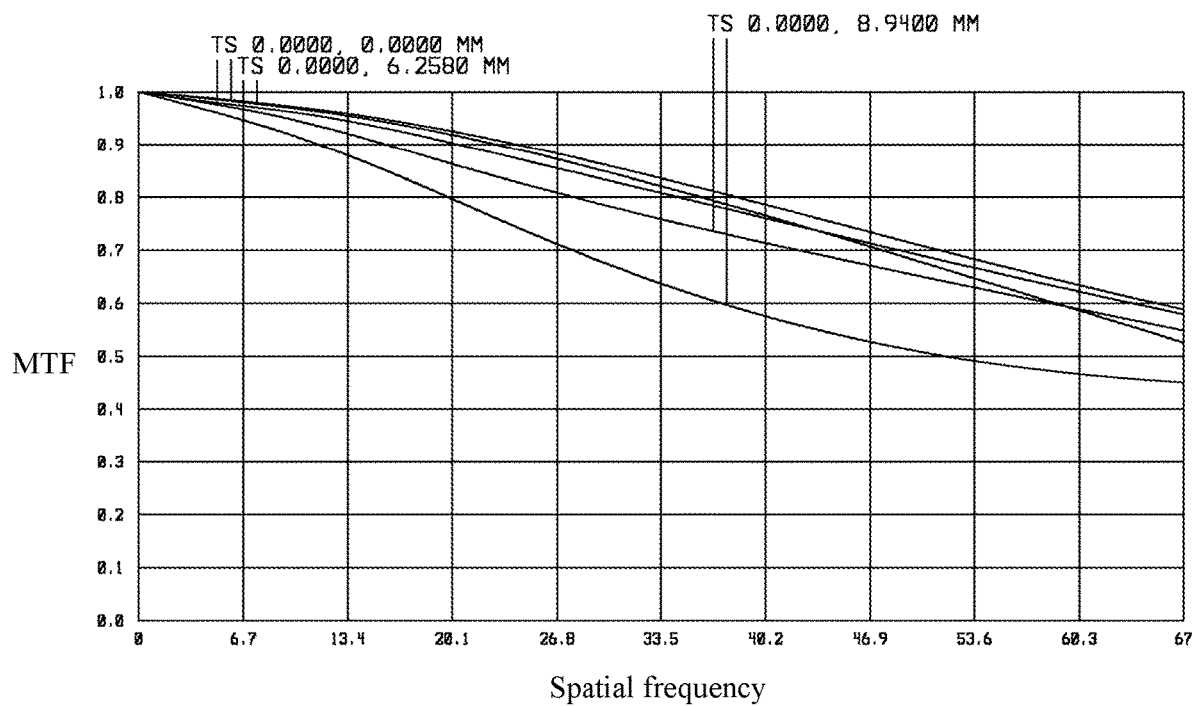
Figure 13:
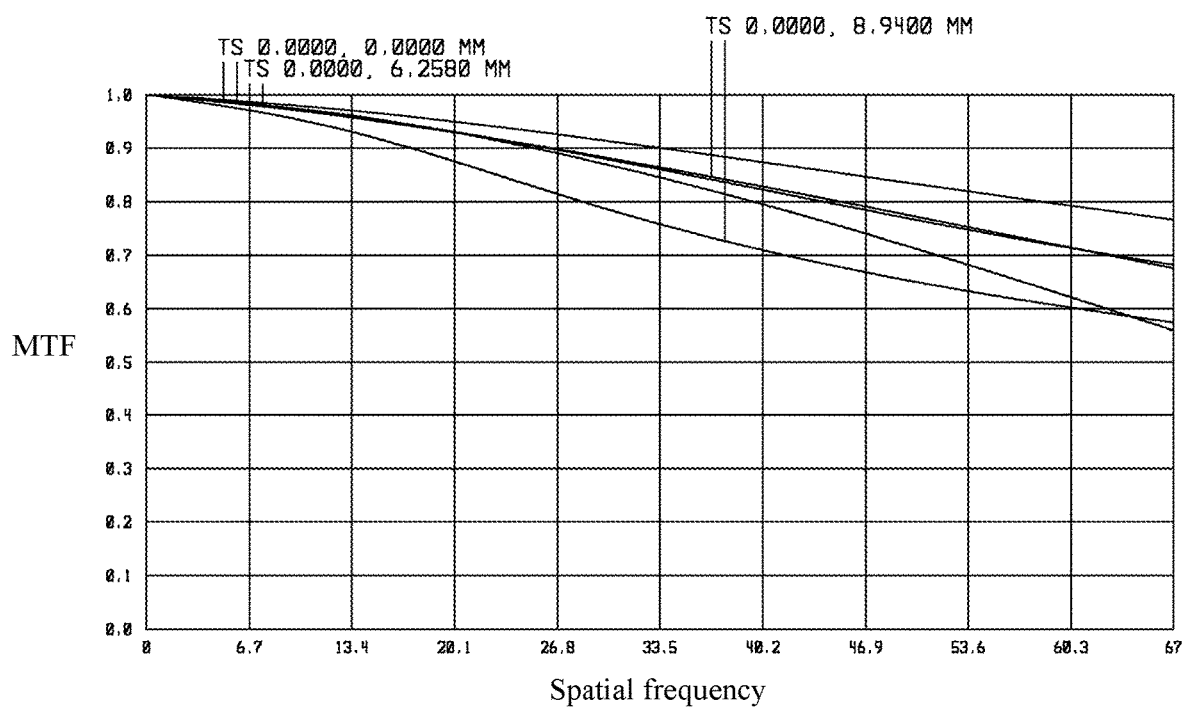
Figure 14:
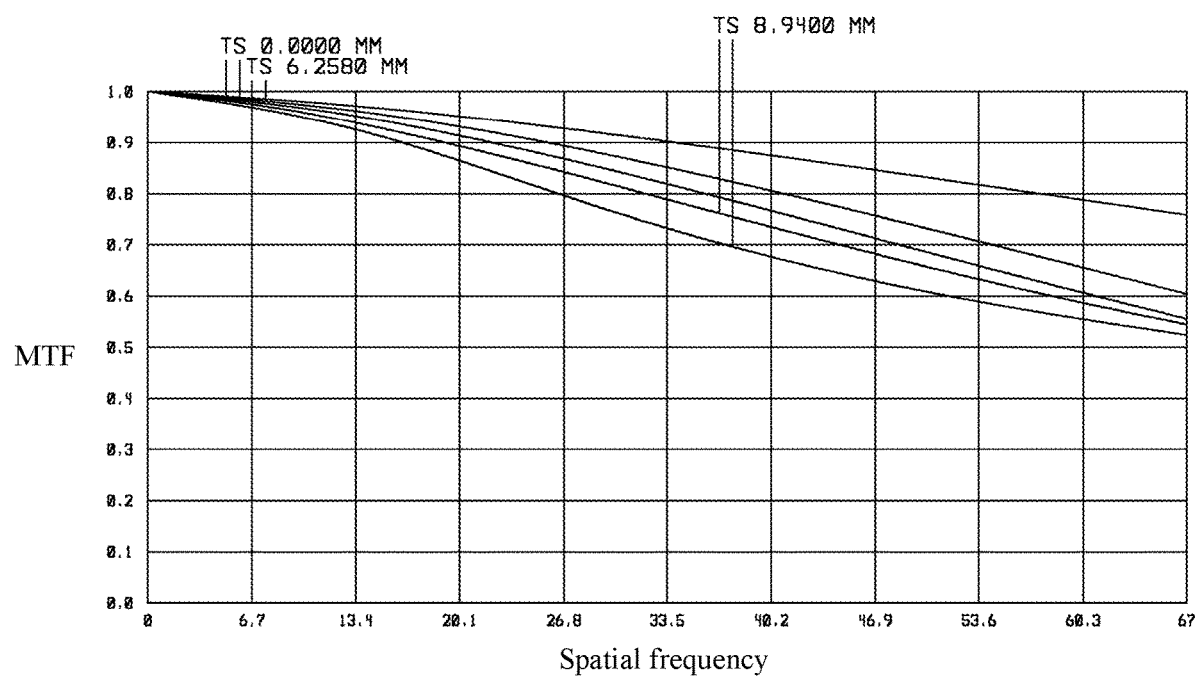
Figure 15:
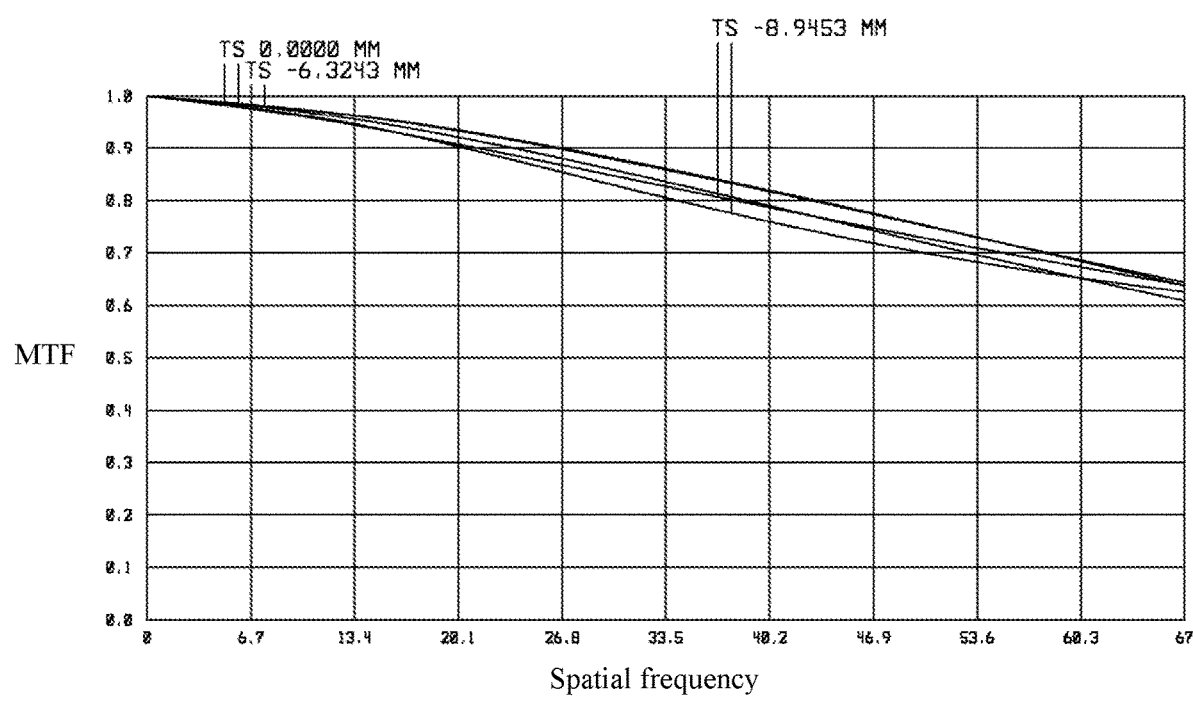
Figure 16:
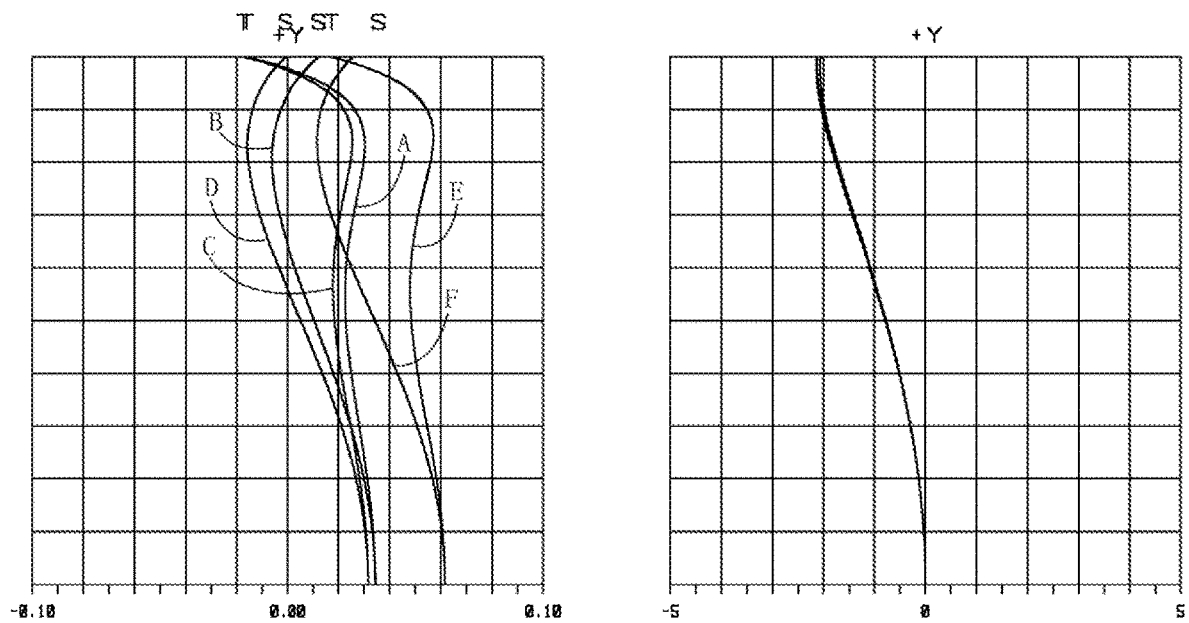
FIGS. 16-20 respectively illustrate astigmatic field curves and percentage distortion curves of zoom lenses of FIGS. 1-5 under different wavelengths of light.
Figure 17:
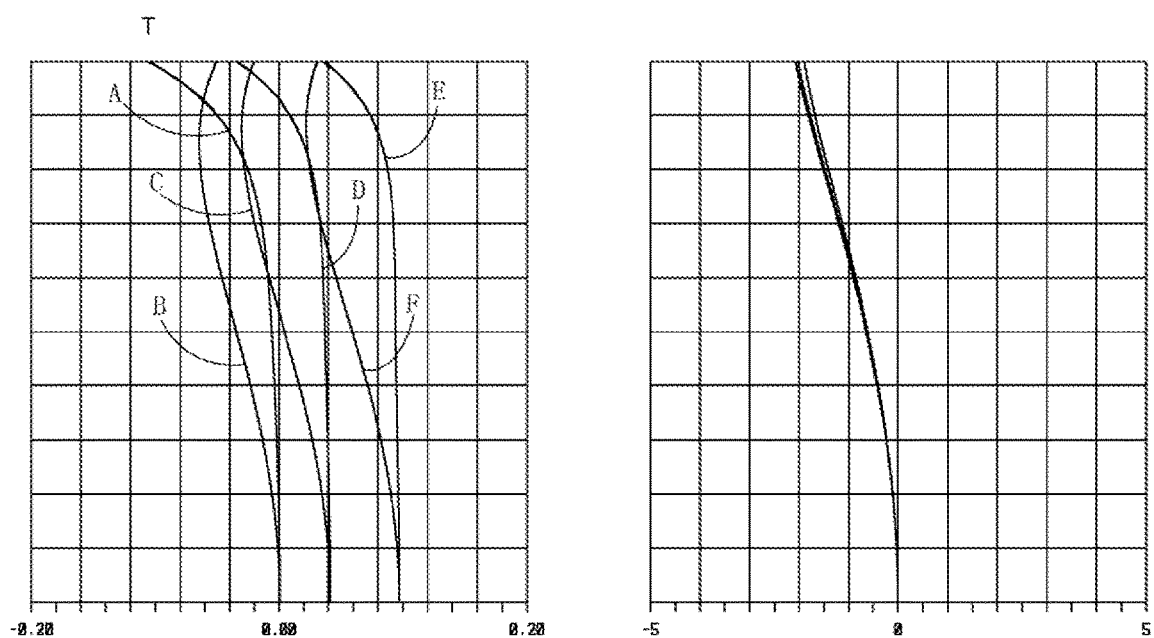
Figure 18:
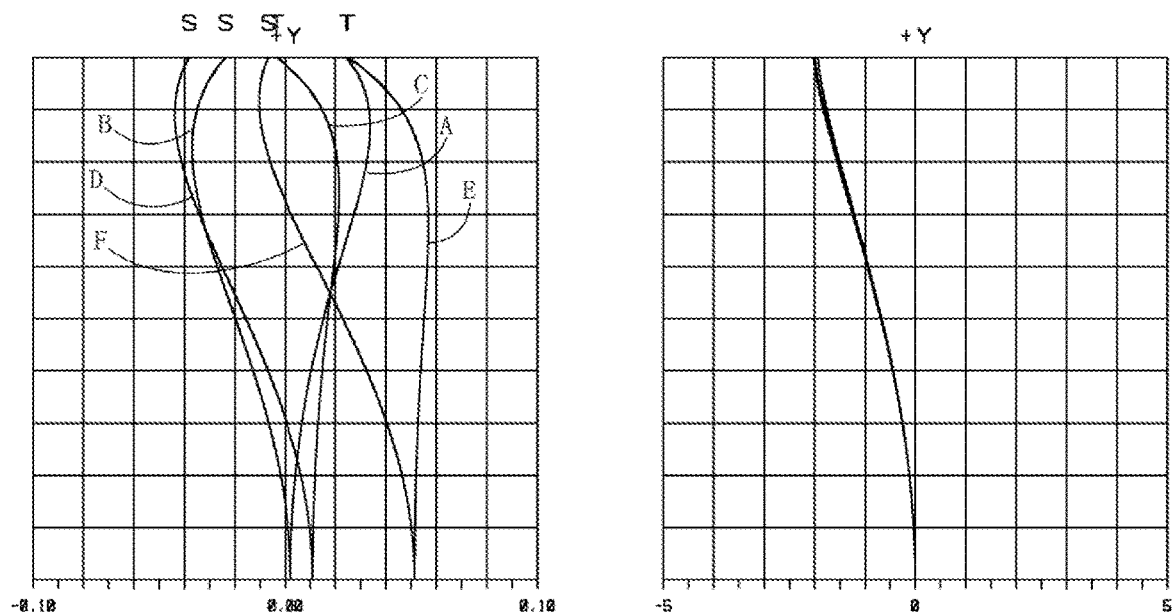
Figure 19:
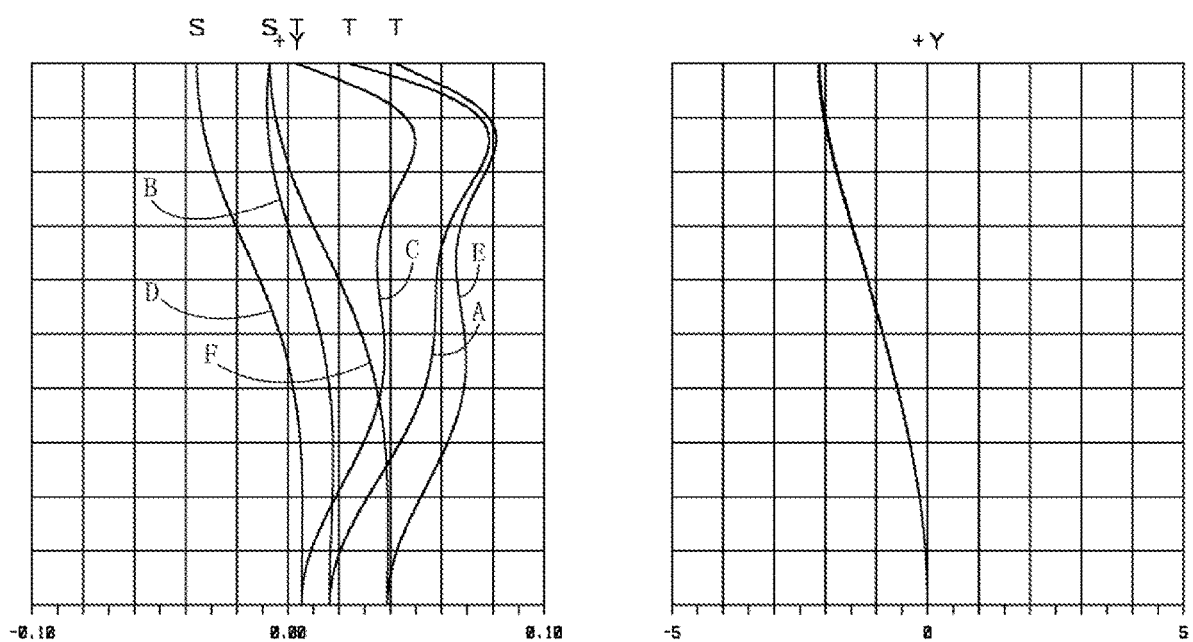
Figure 20:
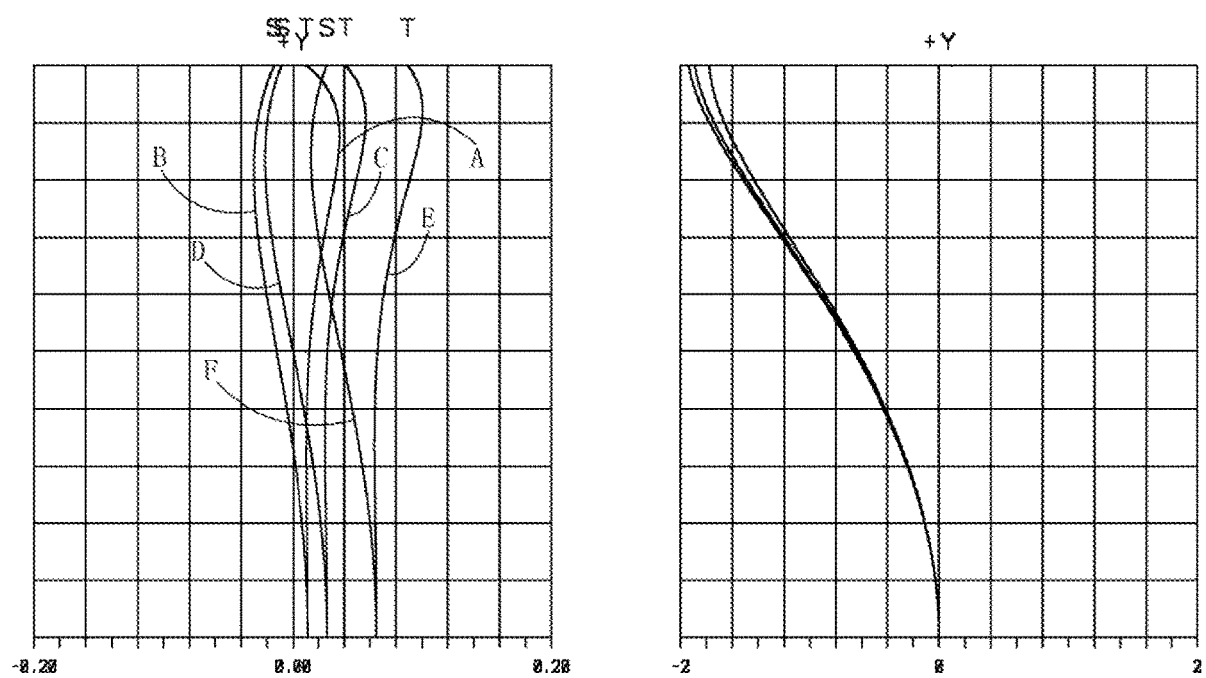

A zoom lens 10e according to another embodiment including lenses L1-L8 (with respective refractive power of negative, negative, positive, negative, positive, positive, negative, positive) is described below with reference to FIG. 5. The lens L3 and lens L4 are arranged together as one piece to form a doublet lens with a negative refractive power, and the lens L6 and lens L7 are arranged together as one piece to form another doublet lens with a negative refractive power. The aperture stop 14 is located between the lens L7 and the lens L8. The lens L8 is an aspheric lens and has a concave magnified-side surface S14 and a convex minified-side surface S15 crossed with the optical axis 12. In other embodiment, the lens L3 may have a negative refractive power, and the lens L4 may have a positive refractive power. In this embodiment, the aspheric lens is made from glass. The detailed optical data of the zoom lens 10e are shown in Table 13 and Table 14, and the aspheric surface data are shown in Table 15 below.

TABLE 13

| Surface number | Radius (mm) | Interval (mm) | Refractive index | Abbe number | Object description |
|---|---|---|---|---|---|
| S1 | 55.6 | 0.80 | 1.52 | 64.1 | lens L1 (meniscus) |
| S2 | 22.8 | 4.26 | | | |
| S3 | 72.1 | 0.80 | 1.50 | 81.5 | lens L2 (meniscus) |
| S4 | 30.7 | d1 | | | |
| S5 | 198.7 | 4.41 | 1.82 | 46.6 | lens L3 (biconvex) |
| S6 | −26.8 | 1.54 | 1.56 | 58.3 | lens L4 (biconcave) |
| S7 | 17.5 | 9.76 | | | |
| S8 | 22.3 | 4.70 | 1.77 | 49.5 | lens L5 (biconvex) |
| S9 | −383.4 | 12.43 | | | |
| S10 | 16.3 | 3.78 | 1.66 | 57.4 | lens L6 (biconvex) |
| S11 | −14.3 | 0.80 | 1.73 | 28.3 | lens L7 (biconcave) |
| S12 | 17.8 | 3.07 | | | |
| S13 | ∞ | 0.77 | | | aperature stop |
| S14 | −26.2 | 6.00 | 1.80 | 40.7 | lens L8 (aspheric) |
| S15 | −13.8 | d2 | | | |
| S16 | ∞ | | | | cover glass surface |

| | d1 | d2 |
|---|---|---|
| wide | 16.73 | 20 |
| tele | 10.39 | 20.97 |

TABLE 14

| | F/# | EFL (mm) | TTL (mm) |
|---|---|---|---|
| wide | 2.1 | 15.6 | 92 |
| tele | 2.17 | 17.2 | 86.63 |

In this embodiment, the total track length TTL is a distance along the optical axis 12 measured from the surface S1 to the surface S16.

TABLE 15

| | K | A | B | C | D | E |
|---|---|---|---|---|---|---|
| S14 | 2.23 | −1.82E−04 | −9.11E−07 | −2.07E−08 | −1.44E−10 | 2.10E−11 |
| S15 | 8.39E−02 | −4.09E−05 | −8.77E−07 | 1.50E−08 | 2.90E−10 | −2.04E−11 |

| | F |
|---|---|
| S14 | −4.54E−13 |
| S15 | 2.45E−13 |

FIGS. 6-20 show optical simulation results of the zoom lens 10a-10e. FIGS. 6-10 respectively shows modulation transfer function (MTF) curves of the zoom lens 10a-10e in the wide-angle position, where an abscissa represents focus shift and an ordinate represents modulus of the optical transfer function (OTF). FIGS. 11-15 respectively shows MTF curves of the zoom lens 10a-10e in the wide-angle position, where an abscissa represents spatial frequencies and an ordinate represents modulus of the OTF. FIGS. 16-20 respectively illustrate astigmatic field curves (with an abscissa unit of millimeter) and percentage distortion curves (with an abscissa unit of percentages) of the zoom lens 10a-10e under different wavelengths of light of 460 nm (curves A and B), 550 nm (curves C and D) and 620 nm (curves E and F), where the symbol "S" indicates data values measured in a sagittal direction and the symbol "T" indicates data values measured in a tangential direction. The simulated results shown in FIGS. 6-20 are within permitted ranges specified by the standard, which indicates the zoom lens 10a-10e according to the above embodiments may achieve good imaging qualities.

According to the above embodiments, the zoom lens may have at least one doublet lens to balance chromatic aberration, and may have at least one aspheric lens to reduce aberration. Besides, the zoom lens may have a reduced number of total lenses and a large aperture stop. Further, the zoom lens may have a smaller value of EXP to reduce the total track length and thus is favorable for miniaturization, where Exp denotes a distance from an intersection to an image plane of a light valve, and the intersection is formed by an optical axis of the zoom lens crossed by a chief ray emerging from a designated point of a periphery of the light valve. In an optical projection system, the image plane of a light valve is typically located in an object side of an optical lens but not an image side for projection of the optical lens.

Accordingly, the zoom lens is featured with good correction ability, reduced size, and improved image qualities.

The foregoing description of the preferred embodiments of the invention has been presented for purposes of illustration and description. It is not intended to be exhaustive or to limit the invention to the precise form or to exemplary embodiments disclosed. For example, the design parameters listed in the tables 1-15 are merely for exemplified purposes, but the invention is not limited thereto. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A zoom lens, comprising:
   a first lens group with a negative refractive power;
   a second lens group with a positive refractive power, wherein each of the first lens group and the second lens group moves individually;
   an aperture stop being disposed in and movable with the second lens group; and
   a first doublet lens disposed on a first side of the aperture stop and between the first lens group and the aperture stop, and a second side of the aperture stop being disposed with at most two lenses having at most two different refractive index values and including at least one aspheric lens, wherein an F number of the zoom lens in a wide-angle position is no more than 2.1.

2. The zoom lens as claimed in claim 1, wherein the aspheric lens is made from glass.

3. The zoom lens as claimed in claim 1, wherein two opposite lens surfaces of the at least one aspheric lens are both aspheric surfaces.

4. The zoom lens as claimed in claim 1, wherein a throw ratio of the zoom lens in a wide-angle position is in the range of 1.3-1.6.

5. The zoom lens as claimed in claim 1, wherein the at least one aspheric lens has a first surface facing the aperture stop and a second surface opposite the first surface, the first surface is a concave surface crossed with an optical axis of the zoom lens, and the second surface is a convex surface crossed with the optical axis of the zoom lens.

6. The zoom lens as claimed in claim 1, wherein the first lens group comprises two meniscus lenses with a negative refractive power.

7. The zoom lens as claimed in claim 1, wherein the first doublet lens has at least one lens with a positive refractive power and an index of refraction of smaller than 1.68.

8. The zoom lens as claimed in claim 1, wherein a total number of lenses of the zoom lens is no more than ten.

9. The zoom lens as claimed in claim 1, wherein the zoom lens satisfies one of the following conditions:
   (1) the first lens group comprises two meniscus lenses with a negative refractive power, the second lens group comprises two lenses with a positive refractive power located between the two meniscus lenses and the first doublet lens, and the aspheric lens has a positive refractive power;
   (2) the first lens group comprises a meniscus lens with a negative refractive power and an aspheric lens, the second lens group comprises a meniscus lens with a negative refractive power located between the first lens group and the first doublet lens, and each aspheric lens in the first lens group and the second lens group has a positive refractive power;
   (3) the first lens group comprises two meniscus lenses with a negative refractive power, the second lens group comprises a biconvex lens with a positive refractive power and a second doublet lens, the biconvex lens and the second doublet lens are located between the first lens group and the first doublet lens, and the aspheric lens of the second lens group has a positive refractive power.

10. The zoom lens as claimed in claim 1, wherein a zoom ratio of the zoom lens is in the range of 1.05-1.2, and a back focus distance of the zoom lens is in the range of 18-24 mm.

11. A zoom lens, comprising:
    a first lens group and a second lens group arranged in order along a direction, each of the first lens group and the second lens group moving individually, the second lens group having a first doublet lens, an aperture stop and an aspheric lens arranged in order in a direction away from the first lens group, and the zoom lens satisfying the condition:
    −26 mm≥Exp≥−28.5 mm, where Exp denotes an exit pupil position with respect to an image plane of a light valve measuring in a direction parallel to an optical axis of the zoom lens.

12. The zoom lens as claimed in claim 11, wherein the aspheric lens is made from glass.

13. The zoom lens as claimed in claim 11, wherein an F number of the zoom lens is no more than 2.2.

14. The zoom lens as claimed in claim 11, wherein a throw ratio of the zoom lens in a wide-angle position is in the range of 1.3-1.6.

15. The zoom lens as claimed in claim 11, wherein the aspheric lens has a first surface facing the aperture stop and a second surface opposite the first surface, the first surface is a concave surface crossed with an optical axis of the zoom lens, and the second surface is a convex surface crossed with the optical axis of the zoom lens.

16. The zoom lens as claimed in claim 11, wherein the first lens group comprises two meniscus lenses with a negative refractive power.

17. The zoom lens as claimed in claim 11, wherein the first doublet lens has at least one lens with a positive refractive power and an index of refraction of smaller than 1.68.

18. The zoom lens as claimed in claim 11, wherein a total number of lenses of the zoom lens is no more than ten.

19. The zoom lens as claimed in claim 11, wherein the zoom lens satisfies one of the following conditions:
(1) the first lens group comprises two meniscus lenses with a negative refractive power, the second lens group comprises two lenses with a positive refractive power located between the two meniscus lenses and the first doublet lens, and the aspheric lens has a positive refractive power;
(2) the first lens group comprises a meniscus lens with a negative refractive power and an aspheric lens, the second lens group comprises a meniscus lens with a negative refractive power located between the first lens group and the first doublet lens, and each aspheric lens in the first lens group and the second lens group has a positive refractive power;
(3) the first lens group comprises two meniscus lenses with a negative refractive power, the second lens group comprises a biconvex lens with a positive refractive power and a second doublet lens, the biconvex lens and the second doublet lens are located between the first lens group and the first doublet lens, and the aspheric lens of the second lens group has a positive refractive power.

20. The zoom lens as claimed in claim 11, wherein a zoom ratio of the zoom lens is in the range of 1.05-1.2, and a back focus distance of the zoom lens is in the range of 18-24 mm.

* * * * *